United States Patent [19]

Falcoz et al.

[11] 4,238,236
[45] Dec. 9, 1980

[54] RAPIDLY COLD WEATHER SETTING/HARDENING MORTARS AND CONCRETES COMPRISED OF HYDRAULIC BINDERS

[75] Inventors: Pierre Falcoz, Champagne au Mont D'or; Raymond Filhol, Lyons; Jean-Nöel Communal, Villeurbanne, all of France

[73] Assignee: Rhone-Poulenc Industries, Paris, France

[21] Appl. No.: 31,999

[22] Filed: Apr. 20, 1979

[30] Foreign Application Priority Data

Dec. 5, 1978 [FR] France .............................. 78 35137

[51] Int. Cl.$^3$ .................................................. C04B 7/35
[52] U.S. Cl. .................................. 106/90; 106/97; 106/314; 106/315
[58] Field of Search ............... 106/90, 97, 314, 315

[56] References Cited

U.S. PATENT DOCUMENTS

| 2,695,850 | 11/1954 | Lorenz | 106/315 |
|---|---|---|---|
| 3,210,207 | 10/1965 | Dodson et al. | 106/315 |
| 3,826,665 | 7/1974 | Hovasse et al. | 106/315 |
| 3,864,141 | 2/1975 | Uchikawa et al. | 106/315 |
| 4,054,461 | 10/1977 | Martin | 106/315 |

*Primary Examiner*—James Poer
*Attorney, Agent, or Firm*—Burns, Doane, Swecker & Mathis

[57] ABSTRACT

Mortars and concretes are formulated from hydraulic binders, and are adapted for more rapid setting and hardening in cold weather, such formulations including the admixture of hydraulic binder, aggregates and water, and such formulations being characterized in that they include:

(a) a water-soluble dispersant/water-reducing agent;
(b) an inorganic basic agent selected from the group comprising the hydroxides of alkali metals other than lithium, alkaline earth metal hydroxides and the mixtures of one of such hydroxides with lithium hydroxide; and
(c) a water-soluble salt of an inorganic oxyacid or an aliphatic or aromatic carboxylic acid, said acid having an ionization constant pKa of less than 2.5 in water at 25°C.

25 Claims, No Drawings

RAPIDLY COLD WEATHER SETTING/HARDENING MORTARS AND CONCRETES COMPRISED OF HYDRAULIC BINDERS

BACKGROUND OF THE INVENTION

1. Field of the Invention

The present invention relates to the manufacture of mortars and concretes from hydraulic binders, and, more especially, relates to the manufacture of mortars and concretes which are particularly well adapted for more rapid setting and hardening, in particular in cold weather, so that same quickly attain high mechanical strengths.

2. Description of the Prior Art

It is well known to this art that mortars and concretes are prepared by mixing hydraulic binders with water and aggregates such as sand, gravel or pebbles.

The expression "hydraulic binders" denotes ingredients such as, for example, cement and line, which are capable of setting by the interaction of water and the constituents of the said binders. It is known that the hydration of cements proceeds in accordance with a two-stage mechanism: the first, which takes a few hours, is referred to as "the setting" and the second, which takes place after the setting, is referred to as "hardening".

The fresh mortar or concrete prepared utilizing these cements is typically introduced into a form or mold defining the ultimate shape of the structure (or part of the structure) which it is desired to obtain. The setting and the hardening are therefore very important phenomena from an industrial point of view because, in order to be able to remove the form or strip it from the mortar or the concrete, it is necessary to wait, on the one hand, until the setting has taken place, and, on the other hand, until the hardening has advanced to a certain degree so as to obtain high initial compressive strengths on the order of at least 40 bars.

Normally, the users of cements desire to be able to obtain much initial strength and to remove the forms or frames within a reasonable time of not more than 24 hours.

Now, the hydration of the cement is a chemical conversion reaction which depends on the temperature. Since the temperatures are constantly varying, it is essential to have available effective means for controlling the rate of hydration for the manufacture of high-grade mortars and concretes. This is particularly important for the manufacture and the use of mortars and concretes during the winter when an accelerated hydration is required in order to avoid the damage caused by very low temperature and in order to obtain, within the desired time, high mechanical strengths which make it possible to strip therefrom the forms.

It is possible to achieve a quick hydration by external heating; but this is an expensive technique because of the equipment required and the heating process itself.

Another means consists in adding an accelerator to the mixture constituting the mortar or the concrete. Calcium chloride is very frequently mentioned among the known accelerators; however, although this compound is very effective for accelerating the setting and the hardening of cements, it is only reluctantly used in the case of reinforced concretes and prestressed concretes because it has proved very corrosive towards the iron bars which comprise the reinforcement for said concretes.

It is also known to manufacture mortars and concretes, which are capable of providing improved initial mechanical strengths, by adding a water-reducing agent to the mixture used for their preparation. The expression "water-reducing agent" denotes a dispersant which makes it possible, given the same degree of workability, to reduce the water content of a given concrete or which, for the same water content, substantially increases this workability, or, alternatively, which makes it possible to achieve these two effects simultaneously.

It is generally considered that the amount of water which is stoichiometrically required in order to cause the cement to harden is on the order of 30% by weight, relative to the cement (the weight ratio water/cement, subsequently referred to as the ratio W/C, is 0.3). However, the cement is only fluid and can only be readily worked by hand if water is added in a proportion on the order of about 50% by weight (W/C=0.5). When a dispersant/water-reducing agent is employed, it is then possible to prepare a paste having the same good fluidity by adding water in proportions of less than 50% by weight.

This results in more rapid setting and hardening, which are due to the fact that the amount of water approaches the amount which is stoichiometrically required for the hydration of the hydraulic binder. However, it has been found that this means is still not perfect; in fact, it has been observed that the acceleration in the setting and hardening which it effects does not make it passible to botain, after 24 hours, at temperatures as low as, for example, 0° C. to 10° C., compressive strengths which are compatible with the stripping of the forms.

Finally, there has previously been no technique which is capable of completely satisfying the need, experienced by the users of hydraulic binders of making available a process which provides mortars and concretes capable of setting and hardening more rapidly, especially in cold weather, in order to make it possible to strip the forms therefrom with the reasonable time desired.

SUMMARY OF THE INVENTION

Accordingly, a major object of the present invention is the provision of mortars and concretes which preserve, over a wide temperature range, ranging up to 20° C. and above, their capability of setting and hardening more rapidly and, consequently, of affording improved initial mechanical strengths.

In consonance with the immediately foregoing, the present invention provides a novel process for formulating mortars and concretes from hydraulic binders, which comprise mixing the hydraulic binder, the aggregates and the water in a manner which is itself known to the art, but which novel process features, the following essential constituents which are added to the typical mixture for the manufacture of the mortars and concretes:

(a) a water-soluble dispersant/water-reducing agent;

(b) an inorganic basic agent selected from the group comprising the hydroxides of alkali metals other than lithium, alkaline earth metal hydroxides and the mixtures of any one of these hydroxides with lithium hydroxide; and (c) a water-soluble salt of an inroganic oxyacid or an aliphatic or aromatic mono- or polycarboxylic acid, optionally substituted by hydrocarbon groups or functional groups other than halogen atoms, and which possesses an ionization constant pKa of less than 2.5, in water at 25° C.

Moreover, in order to carry out the mixing of the aforesaid, a reduced amount of water is used which is less than the amount intended for the manufacture of a control mortar or concrete and which is at least equal to that precise amount which is stoichiometrically required for the hydration of the hydraulic binder.

DETAILED DESCRIPTION OF THE INVENTION

The expression "control mortar or concrete" as utilized herein relates to a mortar or concrete which has been prepared from the same hydraulic binder, the same aggregates and water, without including any type of adjuvant, and comprising an amount of mixing water which makes it possible to readily manually work the fresh paste.

For example, if the hydraulic binder is a cement, the amount of mixing water for the control corresponds to a ratio W/C of 0.5, as per the above. Thus, the preparation of a mortar or concrete using the process according to the present invention will require, for mixing the hydraulic cement/aggregates/adjuvants (a)+(b)+(c) mixture, an amount of water which is less than that corresponding to W/C=0.5 and which can be as small as the amount corresponding to W/C=0.3.

The amount of mixing water preferably employed in the process according to the invention corresponds to a reduced ratio water/hydraulic binder, which is determined so as to retain the fluidity value of the control mortar or concrete.

The application of the process according to the invention to a hydraulic cement in cold weather (between about 0° and 10° C.) accelerates very substantially the setting and the hardening of the latter and makes it possible to increase its mechanical performance characteristics, after 24 hours, by about 120 to 300%; under these conditions, the values required for stripping the forms are easily reached and are even quite considerably exceeded.

The acceleration observed decreases as the temperature of use of the cement increases towards moderate values. However, at 20° C., this acceleration still remains very substantial since the increase in the mechanical performance characteristics, after 24 hours, is on the order of 30 to 200%, depending on the type of cement used.

It is appropriate to note that the increase in the mechanical performance characteristics, after 24 hours, generally takes place without the medium-term performance characteristics, such as those measured after 28 days, suffering any loss, and this constitutes a further advantage of the process according to the present invention; in contrast, a slight increase, which can reach 25% and even more, is observed in this respect.

It has further been found that the technique utilized effects, in particular, an acceleration in hardening, and this constitutes an additional advantage of the process according to the present invention. The accelerating effect on the rate of setting is rather small, this reflecting that the setting time remains comparable to that of untreated cements; as a result, the workability of the fresh mortars and concretes is not substantially reduced, relative to the control mortars and concretes, and same remains compatible with all applications which can be envisaged on a construction site.

The first essential constituent (a) of the compositions to be incorporated in the mixture for the manufacture of the mortars or concretes is a dispersant/water-reducing agent. The choice of this agent essentially depends on its solubility characteristics in water. By way of illustration of such agents, there are mentioned:

the products resulting from the sulfonation of melamine/formaldehye resins by sulfites or sulfonic acid, and the water-soluble salts thereof [compare, in particular, the British Pat. No. 1,169,582, expressly incorporated by reference, for a detailed description of such agents];

the acids obtained by converting lignin utilizing sulfites or sulfurous acid, and also the water-soluble salts thereor [compare, in particular, U.S. Pat. No. 3,772,045, also expressly incorporated by reference];

The water-soluble salts of the condensation products obtained by condensing, with formaldehyde, products resulting from the sulfonation of mononuclear or polynuclear phenols [compare, in particular, British Pat. No. 1,409,136, also expressly incorporated by reference]; and the alkali metal or ammonium salts of organic polyacids such as, for example, polyvinylsulfonic, naphthalenetrisulfonic, carbazoletetrasulfonic and naphtholtrisulfonic acids [compare, in particular, U.S. Pat. No. 2,905,565, also expressly incorporated by reference].

Sulfonated melamine/formaldehyde resins are typically very suitable.

The water-soluble salts of condensation products, having a molecular weight of between 1,500 and 10,000 and obtained by condensing, with formaldehyde, products resulting from the sulfonation of aromatic, monocyclic or fused polycyclic hydrocarbons containing from 1 to 12 benzene nuclei, are also very suitable.

Further examples which are here mentioned are the water-soluble salts obtained by condensing, with formaldehyde, products resulting from the sulfonation of aromatic hydrocarbons such as: benzene, naphthalene, fluorene, anthracene, phenanthrene, pyrene, naphthacene, pentacene, hexacene, heptacene, octacene, nonacene, decacene, undecacene, dodecacene and derivatives of these aromatic compounds having from 1 to 3 linear or branched chain alkyl substituents containing from 1 to 3 carbon atoms.

The said condensation products which fall within the ambit of the present invention are compounds of the structural formula:

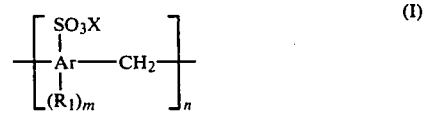

in which: Ar represents monocyclic or fused polycyclic aryl groups containing from 1 to 12 benzene nuclei, such as the aryl groups derived from the above-mentioned aromatic hydrocarbons, $R_1$ represents a linear or branched chain alkyl radical having from 1 to 3 carbon atoms, X is a cationic radical of inorganic or organic origin, which is selected such that the compound of the formula (I) is soluble in water, m is an integer ranging from 0 to 3 and n is a number which is adjusted such that there results a mean molecular weight of between 1,500 and 10,000.

Salts of the formula (I) which are mentioned as being suitable for carrying out the process according to the invention are those in which the cationic radicals X, associated with the sulfonate groups borne by the aromatic rings, are inorganic cations derived from alkali metals of alkaline earth metals such as lithium, sodium, potassium, calcium, and barium, or derived from metals selected from the group comprising lead, aluminum, zinc, and copper; the cations can also be ammonium ions $NH_4^{\oplus}$ or, alternatively, quaternary ammonium ions of the formula: $N(R_2R_3R_4R_5)^{\oplus}$, in which the radicals $R_2$, $R_3$, $R_4$ and $R_5$, which can be identical of different, each represent a linear or branched chain alkyl radical containing from 1 to 4 carbon atoms.

Quaternary ammonium cations which are preferred, are tetramethylammonium, tetraethylammonium, methyltriethylammonium, tetrapropylammonium, triethylbutylammonium and tetrabutylammonium ions.

The salts of the formula (I) can be either simple salts or mixed salts produced by mixing several of the above-mentioned cationic radicals X.

As salts of the formula (I) which are preferably used for carrying out the process according to the invention, there are mentioned those in which: Ar is a naphthyl group, $R_1$ represents a methyl or ethyl radical and the cationic radicals X are inorganic cations derived from metals such as lithium, sodium, potassium, calcium and barium, ammonium ions $NH_4^+$ and quaternary ammonium ions such as tetramethylammonium, tetrapropylammonium and tetrabutylammonium ions.

Among these preferred salts, those which are the most preferred are the sodium, potassium, calcium, barium, ammonium and tetramethylammonium salts of the condensation product having a molecular weight of between 1,500 and 10,000 and obtained by condensing β-naphthalenesulfonic acid with formaldehyde. These salts of high molecular weight β-naphthalenesulfonic acid/formaldehyde condensation products are prepared by utilizing the method described in U.S. Pat. No. 2,141,569, also expressly incorporated by reference.

It is also possible to employ, as the water-reducing agent, a mixture comprising a salt of a high molecular weight condensation product, selected from among those mentioned above, in combination with a water-soluble salt derived from the product, selected from among those mentioned above, in combination with a water-soluble salt derived from the product resulting from the sulfonation of fused polycyclic aromatic hydrocarbons, and corresponding to the structural formula:

in which: Ar' represents fused polycyclic aryl groups containing from 2 to 12 benzene nuclei, such as the aryl groups derived from the fused polycyclic aromatic hydrocarbons mentioned above in the definition of the symbol Ar; $R_1$, X and m have the meanings given above for the formula (I); and p is an integer equal to 1 or 2.

The compounds of the formula (II) which are preferably employed are those in which: Ar' is a naphthyl group, $R_1$ represents a methyl or ehtyl radical, X is a cationic radical representing inorganic cations derived from lithium, sodium, potassium, calcium, and barium, $NH_4^{\oplus}$ ions and quaternary ammonium ions such as tetramethylammonium, tetrapropylammonium and tetrabutylammonium ions, and p is an integer equal to 1.

The salts of the formula (II) can also be simple or mixed salts.

The aromatic sulfonic acid from which the salt of the formula (II) is derived can be the same as that used for the preparation of the salt of formula (I) by subsequent condensation with formaldehyde. In this case, the salt of the formula (II) can optionally be employed, in whole or in part, at the same time as the salt of the formula (I), in the form of a by-product in the event that the aromatic sulfonic acid/HCHO condensation reaction is incomplete and there remains unreacted aromatic sulfonic acid.

In the case where a mixture comprising a high molecular weight condensation product (I) and a salt of a sulfonation product (II) is used, the proportion by weight of the latter in the mixture does not generally exceed 5%.

By way of specific examples of an inorganic basic agent (b) to be employed in the process according to the present invention, there are mentioned: the hydroxides of sodium, potassium, magnesium, calcium, strontium and barium, and binary mixtures of lithium hydroxide with the hydroxides of sodium, potassium and calcium. Both sodium hydroxide and the mixtures: lithium hydroxide/sodium hydroxide and lithium hydroxide/potassium hydroxide are especially suitable.

As regards the third essential constitutent (c) of the compositions to be incorporated in the mixture for the manufacture of the mortars or concretes, water-soluble salts are advantageously used which are derived from: inorganic oxyacids, such as nitric, sulfurous, sulfuric, phosphorous, orthophosphoric, pyrophosphoric and chromic acids, and carboxylic acids, such as cyanoacetic, cyanopropionic, dihydroxymalic, maleic, oxalic, ortho-nitrobenzoic and 2,4,6-trihydroxybenzoic acids.

The cationic part of these salts is not critical, provided that it satisfies the condition requiring the solubility of these products in water; the alkali metal salts and the ammonium salts are typically employed.

Among these salts, sodium sulfate, sodium nitrate and sodium oxalate are very particularly suitable.

For carrying out the process according to the present invention, it is equally possible to use dispersants/water-reducing agents (a) which are either in the form of an anhydrous or hydrated powder, or in the form of a solution in water. The same applies to the basic agents (b) and the salts (c).

It will be noted that, unless specifically indicated, the various adjuvants falling within the scope of the invention are to be understood as being in the anhydrous form.

In the case where the adjuvants (a), (b) and (c) are, in whole or only in part, in the form of a hydrated powder and/or in the form of a solution in water, it must also be understood that the expression "mixing water" encompasses the water of hydration and/or the water used to bring these adjuvants into solution.

The amounts of the aforenoted adjuvants (a), (b) and (c) which are utilized consistent with the scope of the present invention can of course vary over wide limits.

More particularly, such amounts, expressed in percentages by weight relative to the hydraulic binder, are noted as follows: dispersant/water-reducing agent (a):. . . from 0.05 to 3% basic agent (b): hydroxide (other than LiOH): . . . from 0.01 to 1% LiOH: . . . from 0 to 0.5% salt (c): . . . from 0.05 to 2%

The following amounts are preferably used: dispersant/water-reducing agent (a): ... from 0.05 to 1% basic agent (b): hydroxide (other than LiOH): ... from 0.01 to 0.5% LiOH: ... from 0 to 0.3% salt (c): ... from 0.05 to 1%

The process according to the present invention is broadly applicable to all types of hydraulic binders, especially cements, hydraulic limes, rich limes, artificial limes, cement/hydraulic line or rich lime mixtures and plaster.

The process according to the invention is especially successfully applicable to cements. The expression "cement" denotes all the combinations of (lime+silica+alumina) or of (lime+magnesia+silica+alumina+iron oxide) which are commonly referred to as hydraulic cements. The preferred cements are cements of the Portland type, in which the clinker represents at least 65% of the weight; possible additives, which represent at most 35% of the weight, can be fly ash from thermal power stations, puzzolans, blast furnace slag, fillers or mixtures of these products. The said Portland cements also typically comprise calcium sulfate which is introduced in the form of gypsum or anhydrite.

As other types of cements which are envisaged, there are mentioned slag cements, consisting of 50 to 80% by weight of slag and 50 to 20% by weight of Portland clinker, such as, for example, mixed metallurgical cement, blast furnace cement or slag cement containing clinker. Special cements, such as masonry cements and masonry binders, can also be utilized.

As regards the aggregates, namely, sand, gravel or pebbles, their nature, their particle size distribution and their proportions can vary over wide ranges. All mixtures of the known types are envisaged.

The manufacture of the mortars and concretes is carried out in accordance with known and standarized methods. It is appropriate to note that, in practice, the composition of adjuvants (a)+(b)+(c) can be introduced into the binder and the aggregates before mixing, or can preferably be introduced into the mixing water before the latter is used. The said composition can also be introduced into the fresh mortar or concrete immediately before it is used.

The scope of the present invention would not be exceeded by introducing into the medium for the manufacture of the mortars and concretes, in place of the preformed adjuvant composition, the individual adjuvants (a), (b) and (c) and from which the composition would be formulated by simple mixing.

The process according to the invention can be successfully used for preparing reinforced and prestressed concretes because the ingredients used for carrying out such process are characterized by a very market anticorrosive activity.

In order to further illustrate the present invention and the advantages thereof, the following specific examples are given, it being understood that same are intended only as illustrative and in no wise limitative.

In the following examples, mortars were prepared from Portland cement; each mortar having the following formulation:

sand, French Standard Specification P 15403 ... 1,350 g
Portland cement ... 450 g
water:
   for the manufacture of a control mortar: 225 g (W/C=0.5)

for the manufacture of the mortar containing the adjuvants (a), (b) and (c) according to the invention, the weight ratio water/cement is adjusted to a value of less than 0.5 so as to retain the workability of the control mortar.

The manufacture of mortar was carried out in accordance with French Standard Specification P 15403. The cement and the sand are mixed dry according to the proportions indicated above, and the cement+sand combination is mixed with the mixture (formed beforehand) of the adjuvant composition and water.

The various tests are carried out as follows:

Flow test or measurement of the workability of the mortar: this characteristic is measured, 10 minutes after mixing, as the spreading of the mortar which has been molded beforehand in a trunk of a cone having a base diameter of 8 cm, a top diameter of 7 cm and a height of 4 cm. The mortar is placed on a jolt table and is then subjected to a series of 60 jolts at the rate of one jolt per second. After being released from the mold, the mortar is again subjected to a series of 15 jolts at the rate of one jolt per second. The jolt is caused by dropping the mortar from a height of 15 mm. The spreading is expressed in centimeters and corresponds to the mean diameter of the cake obtained after the various jolts.

Measurements of setting times: same are carried out using a Vicat needle in accordance with French Standard Specification P 15431, operating at a temperature at which the mortar test is carried out and in a moisture-saturated medium.

Measurements of the compressive strength (Sc) and flexural strength (Sf): same are carried out in accordance with French Standard Specification P 15451. The strengths are determined on test pieces of dimensions $4\times4\times16$ cm, which have been maintained up to the time of the measurements in a chamber which is at 95–100% relative humidity and has been heated to a temperature corresponding to the temperature at which the mortar test is carried out.

As regards bending the test piece is placed on two roller supports which have a diameter of 10 mm and are 106.7 mm apart; a third roller, which has the same diameter and is equidistant from the other two, transmits a load which is increased by 5 decaN/second. The flexural strength corresponding to the breaking of the test piece is expressed in bars.

As regards compression, the measurement is carried out on the two fragments originating from the test pieces broken by bending. The compression is transmitted by means of two hard-metal plates having a thickness of at least 10 mm, a width of at least 40 mm and a length of at least 40 mm. The load is increased, until fracture occurs, at a rate which is such that the increase in stress is 15 bars/second. The result is expressed in bars. The figures given are the mean of the results using two test pieces broken by bending, and therefore of four compression measurements.

EXAMPLES 1 AND 2

These two examples were carried out at a temperature of 5° C. which corresponds to the temperature of the starting materials, the use temperature and the temperature of the tests; the following were utilized:

as the dispersant/water-reducing agent (a), an aqueous solution containing 40% by weight of the sodium salt of the $\beta$-naphthalenesulfonic acid/formaldehyde condensation product having a mean molecular weight of 4.980 g. This aqueous solution of sodium polymethylenenaphthalenesulfonate (abbreviated to: Na PNS solution) was prepared in the following manner:

640 g (6.5 mols) of concentrated sulfuric acid (d=1.84) were introduced into a 3 liter round-bottomed flask, equipped with a mechanical stirrer and a heating system, and heated to a temperature of 160° C. The stirrer was started and 640 g (5 mols) of purified naphthalene were introduced slowly, the temperature being maintained at the above-mentioned value.

Once the addition of naphthalene was complete, the reaction mixture was stirred at 160° C. until all the naphthalene employed had reacted; the time required was about 4 hours.

The sulfonation medium was then cooled to 100° C. and subsequently diluted with 282 g of water. The temperature of the medium was adjusted to 80° C. and 76.8 g of an aqueous solution of formaldehyde, containing 40% by weight of HCHO, were then added. The reaction mixture was then stirred at 80° C. for one hour.

After this time, an additional 76.8 g of the aqeueous solution of formaldehyde were introduced into the reaction medium and the stirring was continued at 80° C. for one hour. This type of operation was repeated two additional times.

After all the formaldehyde solution (307.2 g) had been introduced, the temperature of the reaction mixture was gradually increased to 95°–100° C. over a period of about 1 hour. Once this temperature had been reached, the reaction mixture was stirred for an additional 18 hours.

After this time, the mixture was cooled to ambient temperature (25° C.) and the sulfuric acidity (corresponds to 1.5 mols of sulfuric acid) and sulfonic acidity (corresponds to 5 mols of sulfonic acid) were determined by potentiometry. The reaction medium was then precisely neutralized with an aqueous mixture comprising: 111.15 g of $Ca(OH)_2$ and 200 g of NaOH. The lime neutralized the sulfuric acidity and yielded a precipitate of hydrated calcium sulfate, which was filtered off. As regards the filtration solution, same contained the desired sodium polymethylenenaphthalenesulfonate; the filtrate was concentrated so as to isolate an aqueous solution containing 40% by weight of pure sodium polymethylenenaphthalenesulfonate.

as the basic agent (b), either a mixture of sodium hydroxide (NaOH)+crystalline lithium hydroxide (LiOH.$H_2O$) Example 1), or sodium hydroxide by itself (Example 2). as the salt (c), sodium sulfate ($Na_2SO_4$).

1. Adjuvant compositions

| EXAMPLE | Na PNS solution | NaOH | LiOH . $H_2O$ | $Na_2SO_4$ |
|---|---|---|---|---|
| 1 | 1% (0.4%) | 0.3% (0.3%) | 0.2% (0.114%) | 0.6% (0.6%) |
| 2 | 1% (0.4%) | 0.3% (0.3%) | — | 0.6% (0.6%) |

The above proportions are given as percentages by weight, relative to the Portland cement, of the adjuvant in the form in which it is used. The proportions of the adjuvant in the anhydrous form are given in brackets.

Motar tests and results

The mortar was manufactured from artificial Portland cement of the CPA-400 GUERVILLE type (tricalcium aluminate content on the order of 10% by weight), marketed by Les Ciments Francais.

By way of comparison, the following tests were carried out:

| TEST | Na PNS solution | NaOH | LiOH . $H_2O$ | $Na_2SO_4$ |
|---|---|---|---|---|
| $A_1$ and $A_2$ controls | — | — | — | — |
| B | 1% (0.4%) | — | — | — |
| C | 1% (0.4%) | 0.3% (0.3%) | — | — |
| D | 1% (0.4%) | — | 0.2% (0.114%) | — |
| E | 1% (0.4%) | — | — | 0.6% (0.6%) |
| F W/C = 0.5 | — | 0.3% (0.3%) | 0.2% (0.114%) | — |
| G W/C = 0.5 | — | 0.3% (0.3%) | — | 0.6% (0.6%) |

The results are summarized in the following table; the variations in the mechanical strengths, in percent, relative to the values of the strengths of the control mortars, are reported in this table.

| EXAMPLE and TEST | MIXING | | | MECHANICAL STRENGTHS (in bars) | | | |
|---|---|---|---|---|---|---|---|
| | W/C | Water reduction % | Spreading cm | 24 hours | | 28 days | |
| | | | | Sc | Sf | Sc | Sf |
| Test $A_1$ control | 0.5 | 0% | 14.4 | 16.1 | 4.6 | 349 | 63.9 |
| Example 1 | 0.44 | 12% | 13.7 | 57.5 +257% | 16.2 +252% | 364 +4.3% | 72.7 +14% |
| Example 2 | 0.45 | 10% | 14.2 | 49.9 +209% | 16.2 +252% | 363 +4% | 68.3 +6.9% |
| Test B | 0.46 | 8% | 14.7 | 23.9 +48% | 7.8 +69% | 327 −6.3% | 64 0% |
| Test C | 0.45 | 10% | 14.6 | 29.2 +81% | 10.8 +135% | 363 +4% | 69.3 +8.5% |
| Test D | 0.45 | 10% | 15.0 | 28.1 +74% | 10.7 +133% | 345 −1% | 64 0% |
| Test E | 0.45 | 10% | 14.5 | 31.9 +98% | 11.2 +143% | 361 +3.4% | 66.3 +3.8% |
| Test $A_2$ control | 0.5 | 0% | 14.1 | 12.7 | 3.6 | 344 | 54 |
| Test F | 0.5 | 0% | 14.5 | 14.7 +15% | 5.7 +58% | 376 +9.3% | 60.5 +12% |
| Test | 0.5 | 0% | 14.6 | 16.3 | 6.4 | 370 | 54.5 |

| EXAM-PLE and TEST | MIXING | | MECHANICAL STRENGTHS (in bars) | | | |
|---|---|---|---|---|---|---|
| | Water reduction % | Spreading cm | 24 hours | | 28 days | |
| | W/C | | Sc | Sf | Sc | Sf |
| G | | | +28% | +78% | +7.5% | +1% |

The data in the table show that, by using the adjuvant composition according to the invention, it is possible to prepare mortars from cements, which possess compressive strengths, at 5° C. and after 24 hours, which are well above the limit of 40 bars which is desired for stripping the shuttering.

The data in the above table also demonstrate a very marked synergistic effect, as regards compressive strengths after 24 hours, which is related to the use of the adjuvant compositions according to the present invention. In fact, by combining three adjuvants (water-reducing agent+NaOH+Na$_2$SO$_4$) or four adjuvants (water-reducing agent+NaOH+LiOH-H$_2$O+Na$_2$SO$_4$), same exert a combination of effects to give an overall result which is not the simple summation of the activity of each adjuvant taken separately.

When preparing the sodium salt of the β-napthalene-sulfonic acid/formaldehyde condensation product, it is indicated that, at the end of the reaction, the medium is precisely neutralized in accordance with two methods, namely, neutralization of the sulfuric acidity with Ca(OH)$_2$, and neutralization of the sulfonic acidity with NaOH to produce Na PNS.

However, it is quite possible to neutralize the sulfuric acidity, totally or partially, with NaOH so as to produce, after total neutralization of the medium, a mixture of sodium sulfate and Na PNS, which can be used, if necessary, after adding an additional amount of sodium sulfate, within the scope of the process according to the present invention.

EXAMPLES 3 TO 6

The purpose of these examples was to show that the mortars prepared in accordance with the process of the invention retain, within a wide temperature range extending up to 20° C. and above, their ability to set and harden more rapidly and, consequently, to give improved initial strengths.

The procedure indicated above in Example 1 was followed and mortar tests were carried out at 6° C. (Example 3), at 9.5° C. (Example 4), at 16° C. (Example 5) and at 20° C. (Example 6).

The results are summarized in the following table; the values of the setting times of the mortars, when operating at 6° C. and at 20° C. are also given in this table:

| EXAMPLE and TEST | MIXING | | | MECHANICAL STRENGTHS (in bars) | | | | SETTING | |
|---|---|---|---|---|---|---|---|---|---|
| | W/C | Water Reduction | Spreading cm | 24 hours | | 28 days | | Start | End |
| | | | | Sc | Sf | Sc | Sf | | |
| 6° C. | | | | | | | | | |
| Control Test A3 | 0.5 | 0% | 14.3 | 25 | 8 | 331 | 57.5 | 10 hours 27 minutes | 17 hours 26 minutes |
| Example 3 | 0.435 | 13% | 15.2 | 83 +232% | 22.3 +179% | 409 +24% | 72.5 +26% | 11 hours 18 minutes | 15 hours 36 minutes |
| 9.5° C. | | | | | | | | | |
| Control Test A4 | 0.5 | 0% | 15.3 | 36 | 9.8 | | | | |
| Example 4 | 0.44 | 12% | 15 | 117 +225% | 32.5 +232% | | | | |
| 16° C. | | | | | | | | | |
| Control Test A5 | 0.5 | 0% | 14.9 | 91 | 21.2 | | | | |
| Example 5 | 0.44 | 12% | 14.8 | 204 +124% | 47.8 +125% | | | | |
| 20° C. | | | | | | | | | |
| Control Test A6 | 0.5 | 0% | 14.6 | 161 | 36 | 470 | 67 | 3 hours 13 minutes | 5 hours 24 minutes |
| Example 6 | 0.45 | 10% | 14.9 | 264 +64% | 49 +36% | 473 +0.6% | 73 +9% | 3 hours | 4 hours 45 minutes |

EXAMPLES 7 TO 10

Examples 3 (at 6° C.) and 6 (at 20° C.) above were repeated, varying the proportions of adjuvants, relative to the cement, and the nature of the dispersant/water-reducing agent: in place of the aqueous solution containing 40% by weight of sodium polymethylenenaphthalenesulfonate, an aqueous solution containing 20% by weight of the sodium salt of the product resulting from the sulfonation of melamine/formaldehyde resin, marketed by Hoechst under the name MELMENT-F 10, was used.

(1) Adjuvant Compositions

| EXAMPLE | WATER-REDUCING AGENT | NaOH | LiOH . H$_2$O | Na$_2$SO$_4$ |
|---|---|---|---|---|
| 6° C. | | | | |
| 7 | Na PNS solution 0.5% (0.2%) | 0.15% (0.15%) | 0.1% (0.057%) | 0.3% (0.3%) |
| 8 | MELMENT solution 3% (0.6%) | 0.15% (0.15%) | 0.1% (0.057%) | 0.3% (0.3%) |
| 20° C. | | | | |
| 9 | Na PNS solution 0.5% (0.2%) | 0.15% (0.15%) | 0.1% (0.057%) | 0.3% (0.3%) |
| 10 | MELMENT solution 2.5% (0.5%) | 0.15% (0.15%) | 0.1% (0.057%) | 0.3% (0.3%) |

(2) Mortar tests and results

| EXAMPLE and TEST | MIXING | | | MECHANICAL STRENGTHS (in bars) | | | |
|---|---|---|---|---|---|---|---|
| | W/C | Water reduction % | Spreading cm | 24 hours | | 28 days | |
| | | | | Sc | Sf | Sc | Sf |
| 6° C. | | | | | | | |
| Control Test A7 | 0.5 | 0% | 13.3 | 27 | 8 | | |
| Example 7 | 0.44 | 12% | 13.8 | 67 +148% | 18.3 +129% | | |
| Example 8 | 0.445 | 11% | 14.0 | 91 +237% | 27 +238% | | |
| 20° C. | | | | | | | |
| Control Test A8 | 0.5 | 0% | 14.6 | 160 | 36 | 470 | 67 |
| Example 9 | 0.46 | 8% | 14.4 | 231 +44% | 50.5 +40% | 524 +11% | 71 +6% |
| Example 10 | 0.46 | 8% | 14.6 | 238 +49% | 54 +50% | 540 +15% | 81 +21% |

EXAMPLES 11 TO 14

These examples illustrate the preparation of mortars from cements other than CPA-400 GUERVILLE used in the above EXAMPLES.

The operating conditions of Example 3 (at 6° C.) were repeated, using, as the cement, artificial Portland cement of the CPA-400 HTS type (tricalcium aluminate content on the order of 4% by weight), marketed by Lafarge (Example 11).

Example 6 (at 20° C.) was again repeated with the following cements: CPA-400 HTS mentioned above (Example 12), artificial Portland cement+slag, CPAL-325 GUERVILLE type, marketed by Les Ciments Francais (Example 13), and cements from slag+clinker, CLK325 MONTALIEU type, marketed by Vicat (Example 14).

The results obtained were as follows:

| EXAMPLE and TEST | | MIXING | | MECHANICAL STRENGTHS (in bars) | | | |
|---|---|---|---|---|---|---|---|
| | W/C | Water Reduction % | Spreading cm | 24 hours | | 28 days | |
| | | | | Sc | Sf | Sc | Sf |
| 6° C. Control Test A9 | 0.5 | 0% | 17.1 | 28 | 7.5 | 381 | 63.8 |
| Example 11 | 0.41 | 18% | 18 | 96 +243% | 17.8 +137% | 491 +29% | 66.5 +4% |
| 20° C. Control Test A10 | 0.5 | 0% | 16.6 | 116 | 26.3 | | |
| Example 12 | 0.4 | 20% | 16.5 | 328 +183% | 59 +124% | | |
| 20° C. Control Test A11 | 0.5 | 0% | 15.8 | 76 | 19 | 311 | 51 |
| Example 13 | 0.43 | 14% | 16.0 | 111 +46% | 34 +79% | 365 +17% | 58 +14% |
| 20° C. Control Test A12 | 0.5 | 0% | 17.2 | 65 | 20 | 366 | 47 |
| Example 14 | 0.4 | 20% | 17.0 | 188 +189% | 46 +130% | 583 +59% | 59 +25% |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. In a process for the formulation of mortars and concretes from hydraulic binders, adapted for more rapid setting and hardening and including the admixture of hydraulic binder, aggregates and water, the improvement which comprises including in said mix:
   (a) a water-soluble dispersant/water-reducing agent;
   (b) an inorganic basic agent selected from the group comprising the hydroxides of alkali metals other than lithium, alkaline earth metal hydroxides and the mixtures of one of such hydroxides with lithium hydroxide; and
   (c) a water-soluble salt of an inorganic oxyacid or an aliphatic or aromatic carboxylic acid, said acid having an ionization constant pKa of less than 2.5 in water at 25° C.

2. The process as defined by claim 1, the amount of water admixed being at least that amount stoichiometrically required for hydration of the hydraulic binder.

3. The process as defined in claim 1, the salt (c) being substituted with a member selected from the group consisting of a hydrocarbon substituent and a non-halo functional group.

4. The process as defined by claim 1, wherein the dispersant/water-reducing agent (a) comprises the water-soluble salts of condensation products, having a molecular weight between 1,500 and 10,000 and obtained by condensing, with formaldehyde, products resulting form the sulfonation of monocyclic or fused polycyclic hydrocarbons containing from 1 to 12 benzene nuclei, or a mixture of the said salts with water-soluble salts derived from the products resulting from the sulfonation of fused polycyclic aromatic hydrocarbons containing 2 to 12 benzene nuclei.

5. The process as defined by claim 1, wherein the dispersant/water-reducing agent (a) comprises the water-soluble salts of products resulting from the sulfonation of melamine/formaldehyde resins.

6. The process as defined by claims 1, 4 or 5, wherein the inorganic basic agent (b) is selected from the group comprising the hydroxides of sodium, potassium, magnesium, calcium, strontium and barium, and binary mixtures of lithium hydroxide with the hydroxides of sodium, potassium and calcium.

7. The process as defined by claims 1, 4, or 5, wherein the salt (c) is selected from the group comprising the alkali metal salts and the ammonium salts derived from nitric, sulfurous, sulfuric, phosphorous, orthophosphoric, pyrophosphoric, chromic, cyannoacetic, cyanopropionic, dihydroxymalic, maleic, oxalic, orthonitrobenzoic and 2,4,6 trihydroxybenzoic acids.

8. The process as defined by claim 1, wherein the adjuvants (a), (b) and (c) are present in the amounts: 0.05 to 3% by weight, relative to the hydraulic binder, of dispersant/water-reducing agent (a), 0.01 to 1% by weight, relative to the hydraulic binder, of hydroxide of alkali metals other than lithium, or of alkaline earth metal hydroxide, 0 to 0.5% by weight, relative to the hydraulic binder, of lithium hydroxide, and 0.05 to 2% by weight, relative to the hydraulic binder, of water-soluble salt (c).

9. The process as defined by claim 1, wherein the hydraulic binder is a cement.

10. The process as defined by claim 9, wherein the weight ratio water/cement in the mixture cement/aggregates/adjuvants (a)+(b)+(c)/water is less than 0.5 and is equal to at least 0.3.

11. The process as defined by claim 1, wherein the weight ratio water/binder in the mixture hydraulic binder/aggregates/adjuvants (a)+(b)+(c)/water is such that the fluidity of the admixture is maintained.

12. A composition of matter comprising:
   (a) a water-soluble dispersant/water-reducing agent;
   (b) an inorganic basic agent selected from the group comprising the hydroxides of alkali metals other than lithium, alkaline earth metal hydroxides and the mixtures of one of such hydroxides with lithium hydroxide; and
   (c) a water-soluble salt of an inorganic oxyacid or an aliphatic or aromatic carboxylic acid, said acid having an ionization constant pKa of less than 2.5 in water at 25° C.

13. The composition of matter as defined by claim 12, wherein the dispersant/water-reducing agent (a) comprises the water-soluble salts of condensation products, having a molecular weight between 1,500 and 10,000 and obtained by condensing, with formaldehyde, products resulting form the sulfonation of monocyclic or fused polycyclic hydrocarbons containing from 1 to 12 benzene nuclei, or a mixture of the said salts with water-soluble salts derived from the products resulting from the sulfonation of fused polycyclic aromatic hydrocarbons containing 2 to 12 benzene nuclei.

14. The composition of matter as defined by claim 12, wherein the dispersant/water-reducing agent (a) comprises the water-soluble salts of products resulting from the sulfonation of melamine/formaldehyde resins.

15. The composition of matter as defined by claims 12, 13 or 14, wherein the inorganic basic agent (b) is selected from the group comprising the hydroxides of sodium, potassium, magnesium, calcium, strontium and barium, and binary mixtures of lithium hydroxide with the hydroxides of sodium, potassium and calcium.

16. The composition of matter as defined by claims 12, 13, or 14, wherein the salt (c) is selected from the group comprising the alkali metal salts and the ammonium salts derived from nitric, sulfurous, sulfuric, phosphorous, orthophosphoric, pyrophosphoric, chromic, cyannoacetic, cyanopropionic, dihydroxymalic, maleic, oxalic, orthonitrobenzoic and 2,4,6 trihydroxybenzoic acids.

17. A composition of matter comprising:
   (a) an hydraulic binder;
   (b) aggregates;
   (c) a water-soluble dispersant/water-reducing agent;
   (d) an inorganic basic agent selected from the group comprising the hydroxides of alkali metals other than lithium, alkaline earth metal hydroxides and the mixtures of one of such hydroxides with lithium hydroxide; and
   (e) a water-soluble salt of an inorganic oxyacid or an aliphatic or aromatic carboxylic acid, said acid having an ionization constant pKa of less than 2.5 in water at 25° C.

18. The composition of matter as defined by claim 17, the hydraulic binder (a) being a cement.

19. The composition of matter as defined by claim 18, said cement being Portland cement.

20. The composition of matter as defined by claim 17, further comprising water, in an amount at least that stoichiometrically required for hydration of the hydraulic binder.

21. A shaped article comprising the composition of matter as defined by claims 17 or 20.

22. The process as defined by claim 6 wherein the salt (c) is selected from the group comprising the alkali metal salts and the ammonium salts derived from nitric, sulfurous, sulfuric, phosphorous, orthophosphoric, pyrophosphoric, chromic, cyannoacetic, cyanopropionic, dihydroxymalic, maleic, oxalic, orthonitrobenzoic and 2,4,6-trihydroxybenzoic acids.

23. The composition of matter as defined by claim 15 wherein the salt (c) is selected from the group comprising the alkali metals salts and the ammonium salts derived from nitric, sulfurous, sulfuric, phosphorous, orthophosphoric, pyrophosphoric, chromic, cyannoacetic, cyanopropionic, dihydroxymalic, maleic, oxalic, orthonitrobenzoic and 2,4,6-trihydroxybenzoic acids.

24. A composition of matter consisting essentially of:
(a) a water-soluble dispersant/water-reducing agent;
(b) an inorganic basic agent selected from the group comprising the hydroxides of alkali metals other than lithium, alkaline earth metal hydroxides and the mixtures of one of such hydroxides with lithium hydroxide; and
(c) a water-soluble salt of an inorganic oxyacid or an aliphatic or aromatic carboxylic acid, said acid having an ionization constant pKa of less than 2.5 in water at 20° C.

25. A composition of matter consisting essentially of:
(a) an hydraulic binder;
(b) aggregates;
(c) a water-soluble dispersant/water-reducing agent;
(d) an inorganic basic agent selected from the group comprising the hydroxides of alkali metals other than lithium, alkaline earth metal hydroxides and the mixtures of one of such hydroxides with lithium hydroxide; and
(e) A water-soluble salt of an inorganic oxyacid or an aliphatic or aromatic carboxylic acid, said acid having an ionization constant pKa of less than 2.5 in water at 25° C.

* * * * *